United States Patent
Fok et al.

(10) Patent No.: US 12,259,290 B2
(45) Date of Patent: Mar. 25, 2025

(54) PRESSURE SENSOR WITH CORRUGATED ISOLATOR SUPPORT

(71) Applicant: Rosemount Aerospace Inc., Burnsville, MN (US)

(72) Inventors: Ben Pingtao Fok, Farmington, MN (US); Michael Blesi, Apple Valley, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 291 days.

(21) Appl. No.: 18/088,181

(22) Filed: Dec. 23, 2022

(65) Prior Publication Data
US 2024/0210263 A1    Jun. 27, 2024

(51) Int. Cl.
*G01L 19/06*    (2006.01)
*G01L 19/14*    (2006.01)

(52) U.S. Cl.
CPC ........ *G01L 19/0645* (2013.01); *G01L 19/145* (2013.01)

(58) Field of Classification Search
None
See application file for complete search history.

(56) References Cited

U.S. PATENT DOCUMENTS

| | | | | |
|---|---|---|---|---|
| 3,800,413 A | * | 4/1974 | Frick | G01L 13/025 73/718 |
| 4,227,418 A | * | 10/1980 | Bonner | G01L 9/0072 361/283.4 |
| 4,798,089 A | * | 1/1989 | Frick | G01L 19/0645 73/717 |
| 5,495,768 A | * | 3/1996 | Louwagie | G01L 19/086 73/756 |
| 9,797,796 B2 | | 10/2017 | Lemke et al. | |

(Continued)

FOREIGN PATENT DOCUMENTS

| DE | 20019067 U1 | 1/2001 |
|---|---|---|
| DE | 102008037736 A1 | 2/2010 |

(Continued)

OTHER PUBLICATIONS

Extended European Search Report for European Patent Application No. 23220344.8, dated Apr. 24, 2024, 10 pages.

(Continued)

*Primary Examiner* — Son T Le
*Assistant Examiner* — Jermaine L Jenkins
(74) *Attorney, Agent, or Firm* — Kinney & Lange, P.A.

(57) ABSTRACT

A pressure sensor includes a header with a cavity, a pressure sensing element, an isolator, an isolator support, a damping gap, and oil. The pressure sensing element is in the cavity. The isolator has corrugations and is mounted to a top of the header. The isolator covers the cavity. The isolator support is in the cavity of the header above the pressure sensing element. The isolator support is corrugated. The corrugations of the isolator support align with the corrugations on the isolator. The damping gap is between the isolator support and the isolator. The damping gap has a constant width between the isolator support and the isolator. Oil fills the damping gap and the cavity in the header. The oil moves between the damping gap and the header cavity in response to external pressure changes moving the isolator.

14 Claims, 5 Drawing Sheets

(56) References Cited

U.S. PATENT DOCUMENTS

| | | | |
|---|---|---|---|
| 10,203,255 B2* | 2/2019 | Wagner | G01L 27/002 |
| 10,371,591 B2* | 8/2019 | Wagner | G01L 19/04 |
| 2022/0316971 A1 | 10/2022 | Potasek et al. | |

FOREIGN PATENT DOCUMENTS

| | | |
|---|---|---|
| DE | 102018131795 A1 | 6/2020 |
| WO | 1981003678 A1 | 12/1981 |

OTHER PUBLICATIONS

Hohlfeld, O., et al., "Miniature hermetically sealed housing for pressure sensors", Mechatronics, Pergamon Press, Oxford, GB, vol. 12, No. 9-10, Nov. 1, 2022, pp. 1201-1212, XP004374267, ISSN 0957-4158.

* cited by examiner

PRESSURE SENSOR WITH CORRUGATED ISOLATOR SUPPORT

BACKGROUND

This application relates to pressure sensors and, more specifically, pressure sensors utilizing corrugated foil disc isolators.

Pressure sensors with isolators utilize oil inside of a header, or housing, to sense surrounding pressure in hydraulic systems. The isolator protects a sensing element in the pressure sensor from damage caused by direct interaction with the hydraulic system. Hydraulic fluid exerts pressure on the foil disc isolator causing the oil to move within the pressure sensor, which is sensed by the pressure sensing element. Isolators are corrugated to keep sensor outputs linear over a wide range of operating temperatures.

Dynamic pressure events include pressure spikes (often above a maximum pressure considered for the pressure sensor) or uneven applications of pressure on the isolator. Dynamic pressure events can crush the corrugations on the isolator or puncture a middle portion of the isolator. Crushed, punctured, and otherwise damaged isolators have decreased sensitivity, accuracy, and precision.

SUMMARY

A pressure sensor includes a header with a cavity, a pressure sensing element, an isolator, an isolator support, a damping gap, and oil. The pressure sensing element is in the cavity. The isolator has corrugations and is mounted to a top of the header. The isolator covers the cavity. The isolator support is in the cavity of the header above the pressure sensing element. The isolator support is corrugated. The corrugations of the isolator support align with the corrugations on the isolator. The damping gap is between the isolator support and the isolator. The damping gap has a constant width between the isolator support and the isolator. Oil fills the damping gap and the cavity in the header. The oil moves between the damping gap and the header cavity in response to external pressure changes moving the isolator.

DETAILED DESCRIPTION

Figure 1B:
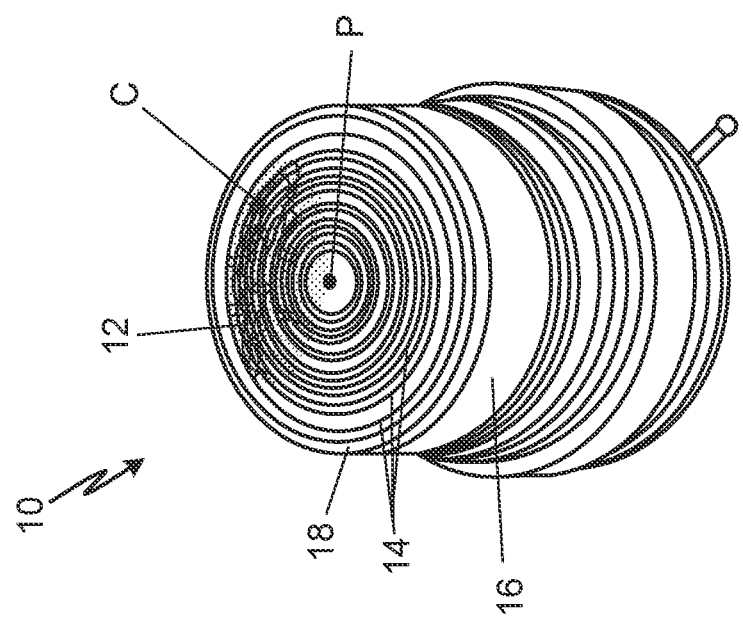
FIG. 1B is a perspective view of the prior art pressure sensor after a dynamic pressure event.
Figure 1A:
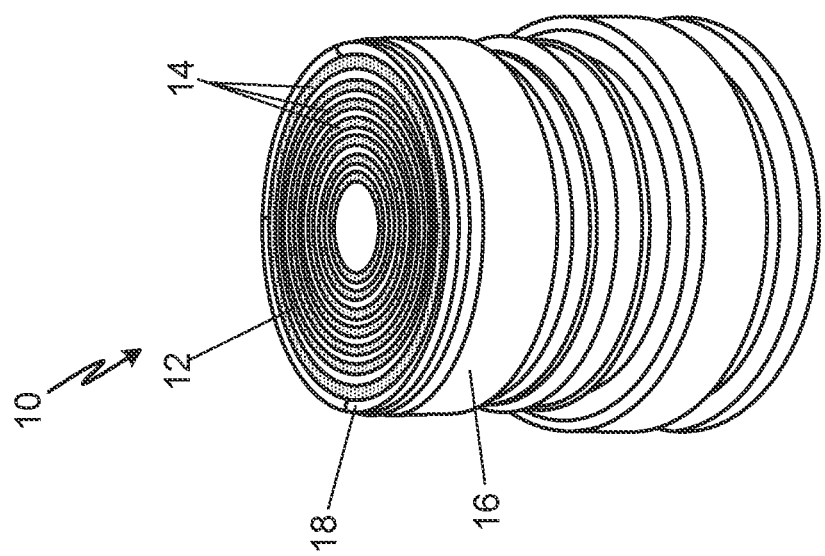
FIG. 1A is a perspective view of a prior art pressure sensor.
Figure 2:
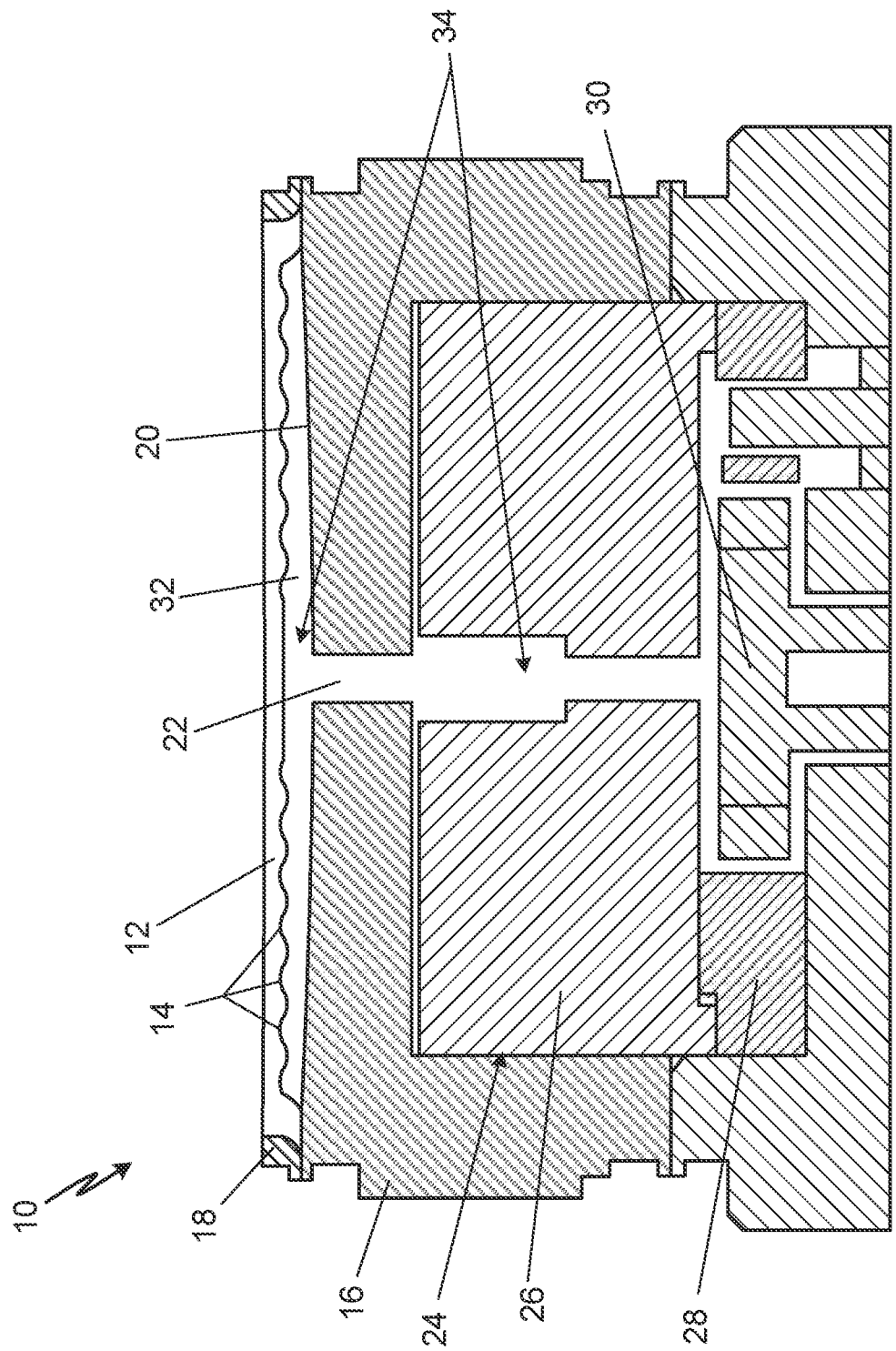
FIG. 2 is a schematic cross-sectional side view of the prior art pressure sensor.

FIG. 1A is a perspective view of prior art pressure sensor 10. FIG. 1B is a perspective view of damaged prior art pressure sensor 10 after a dynamic pressure event. FIG. 2 is a schematic cross-sectional side view of prior art pressure sensor 10. FIGS. 1A, 1B, and 2 will be discussed together. Pressure sensor 10 includes isolator 12 with corrugations 14, header 16, and weld ring 18. Header 16 includes dished isolator support 20 (shown in FIG. 2) with hole 22 (shown in FIG. 2) and cylindrical cavity 24 (shown in FIG. 2). Pressure sensor 10 also includes first filler material 26 (shown in FIG. 2), second filler material 28 (shown in FIG. 2), pressure sensing element 30, gap 32 (shown in FIG. 2), and oil 34 (shown in FIG. 2). FIG. 1B also includes area C and area P of isolator 12.

Pressure sensor 10 has isolator 12, which is a thin disc of metal stamped to include corrugations 14. Header 16 acts as a housing for components of pressure sensor 10. Header is made of metal. Isolator 12 is positioned over a top of header 16. Isolator 12 and header 16 are welded together with weld ring 18. Header 16 has dished isolator support 20 located at the top of header 16 under isolator 12. Dished isolator support 20 is concave to isolator 12 such that a middle of dished isolator support 20 is farther away from isolator 12 than an edge of dished isolator support 20. Header 16 includes hole 22 through dished isolator support 20 near the middle of dished isolator support 20. Cavity 24 is a cylindrical space in header 16.

First filler material 26 and second filler material 28 are positioned in cavity 24. First filler material 26 and second filler material 28 can be adhered to one another and to header 26. First filler material 26 has a central channel aligned with hole 22. Second filler material 28 is designed to fit around pressure sensing element 30, which is near a bottom of cavity 24. Pressure sensing element 30 is electrically connected to other elements to transmit sensed pressure readings. Pressure sensing element 30 can be any appropriate pressure sensing element, including a strain gauge or a micro electro-mechanical systems (MEMS) device.

Pressure sensor 10 also has gap 32 between a bottom of isolator 12 and a top of dished isolator support 20. Gap 32 is wider near the middle of dished isolator support 20 and narrower near the edge of dished isolator support 20. Pressure sensor 10 is filled with oil 34, including in gap 32, hole 22, the channel in first filler material 28, and partially surrounding pressure sensing element 30. Oil 34 can move between gap 32, hole 22, the channel in first filler material 28, and around pressure sensing element 30.

Pressure sensor 10 can be used to make pressure measurements of fluid in contact with isolator 12. For example, pressure sensor 10 can be installed in a port of a hydraulic braking system such that hydraulic fluid in the braking system can interact with isolator 12. Hydraulic brake systems can have pressures upwards of 4,000 PSI where pressure sensor 10 is located.

When pressure is exerted on isolator 12 (for example, by engaging the braking system), it moves from a neutral state to a depressed state. In the depressed state, isolator 12 is close to or touching dished isolator support 20. In the neutral state (shown in FIG. 2), isolator 12 is away from dished isolator support 20 and generally flat across the top of header 16. Movement of isolator 12 moves oil 34 between gap 32 and cavity 24. Hole 22 in dished isolator support 20 allows for oil 34 to move between gap 32 and cavity 24 through dished isolator support 20. Pressure sensing element 30 registers pressure changes from oil 34 movement between gap 32 and cavity 24. The pressure signal can then be transmitted from the pressure sensing element 30.

Pressure sensor 10 operates in a wide range of temperatures. Isolator 12 has corrugations 14 that ensure repeatable and linear sensor behavior over multiple temperatures. Corrugations 14 accomplish this by allowing isolator 10 to move as oil 34 expands and contracts with temperature changes. First filler material 26 and second filler material 28 decrease the amount of oil 34 needed to fill pressure sensor 10, which reduces volume changes with temperature fluctuations. This increases accuracy of temperature calibrations and allows for linear pressure measurements at multiple temperatures.

Dynamic pressure events can move isolator 12 against dished isolator support 20. Dished isolator support 20 has a flat surface, which is mismatched with corrugations 14 on isolator 12. The mismatched shapes cause crush and puncture damage during dynamic pressure events. Dynamic pressure events (pressure events that are high pressure and cause non-uniform pressure distribution on isolator 12) can damage isolator 12. Corrugations 14 on isolator 12 can crush, as shown in area C of FIG. 1B. Crushing damage includes deformation of corrugations 14 of isolator 12. Isolator 12 can also be punctured, as shown in area P of FIG. 1B. Puncture damage can include a dimple or a perforation in isolator 12. Crush and puncture damage occur when isolator 12 quickly and/or unevenly moves into the depressed state. Crush and puncture damage can also occur when isolator 12 collides with dished isolator support 20. Damage, like crushing and puncturing, reduces performance of pressure sensor 10, including decreased sensitivity, accuracy, and precision. If pressure sensor 10 experiences multiple dynamic pressure events, pressure sensor 10 will experience accumulated output degradation.

The curved shape of dished isolator support 20 allows for gap 32 to hold more oil 34. Additional oil 34 theoretically cushions isolator 12. However, the additional oil 34 in gap 32 reduces the accuracy of temperature calibration of pressure sensor 10. This reduces performance of pressure sensor 10 at different temperatures. Further, isolator 12 still sustains crush and/or puncture damage at high pressures. Hole 22, while necessary for pressure sending in pressure sensor 10, allows for volumes of oil 34 to move beneath a center of isolator 12 and creates instability which can lead to puncture damage.

Figure 3:
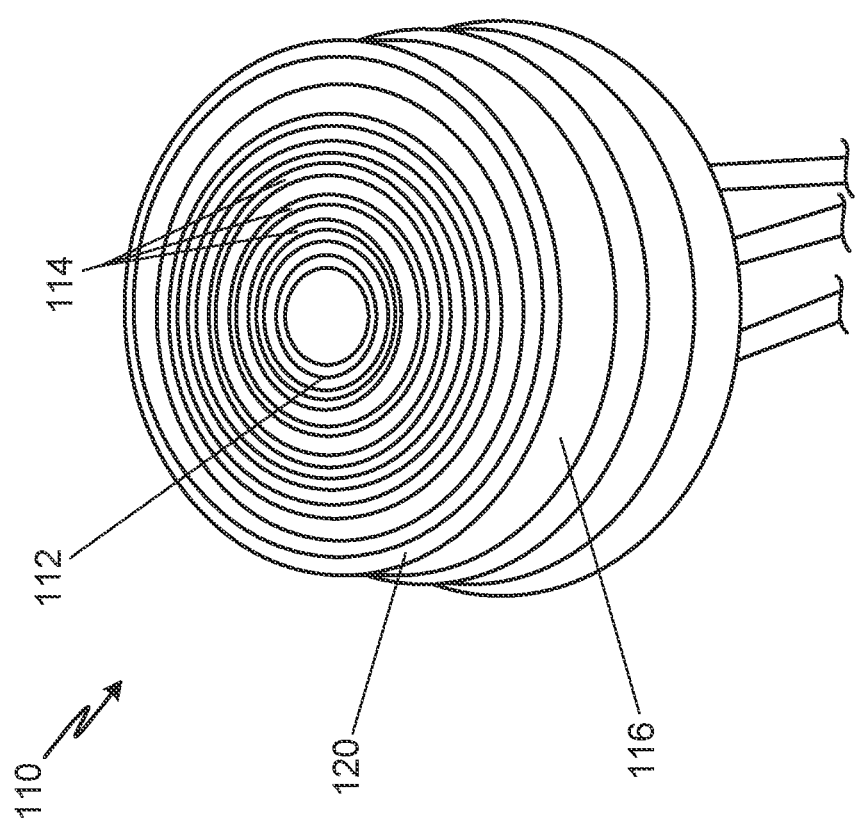
FIG. 3 is a perspective view of a pressure sensor.
Figure 4:
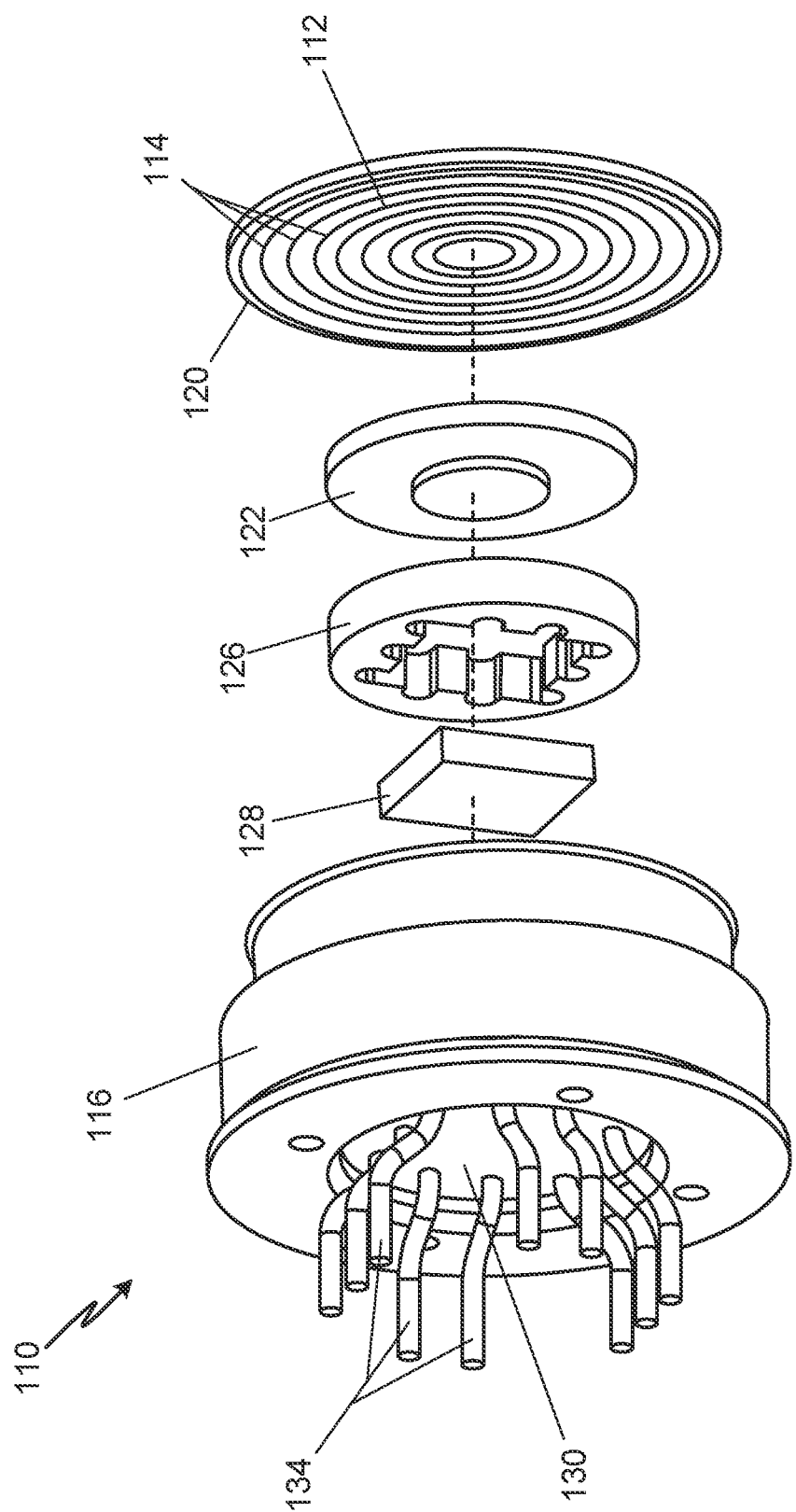
FIG. 4 is an exploded view of the pressure sensor of FIG. 3.
Figure 5:
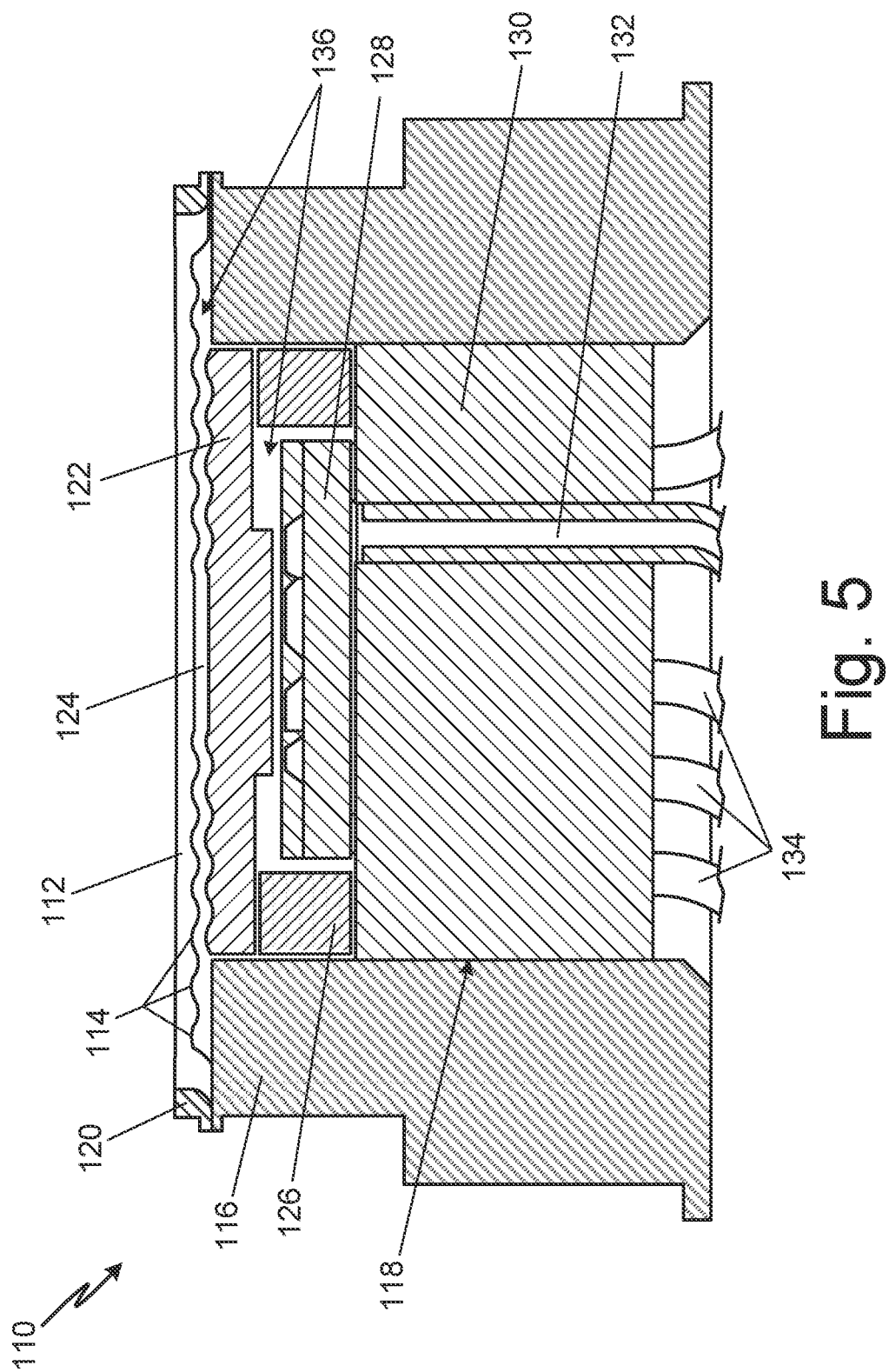
FIG. 5 is a schematic cross-sectional side view of the pressure sensor of FIG. 3.

FIG. 3 is a perspective view of pressure sensor 110. FIG. 4 is an exploded view of pressure sensor 110. FIG. 5 is a schematic cross-sectional side view of pressure sensor 110. FIGS. 3-5 will be discussed together. Pressure sensor 110 includes isolator 112 with corrugations 114, header 116 with cavity 118 (shown in FIG. 5), and weld ring 120. Pressure sensor 110 also includes corrugated isolator support 122 (shown in FIGS. 4-5), gap 124 (shown in FIG. 5), filler material 126 (shown in FIGS. 4-5), pressure sensing element 128 (shown in FIGS. 4-5), plug 130 (shown in FIGS. 4-5), electrical connections 132 (shown in FIG. 5), s-pins 134 (shown in FIGS. 4-5), and oil 134 (shown in FIG. 5).

Pressure sensor 110 can be used, for example, with a hydraulic braking system on an aircraft. Isolator 112 is a foil disc stamped with corrugations 114. Isolator 112 is approximately 0.001 inch thick. Isolator 112 is made of a metal. Isolator 112 is mounted on a top of header 116, which is a housing for pressure sensor 110. Within header 116 is cylindrical cavity 118. Isolator 112 is held to the top of header 116 by weld ring 120. Weld ring 120, isolator 112, and header 116 are all welded together.

Corrugated isolator support 122 is positioned inside cylindrical cavity 118 near a top of header 116. Corrugated isolator support 122 has corrugations that align with corrugations 114 on isolator 112. Corrugated isolator support 122 is made from a material with a low coefficient of thermal expansion (CTE). Example materials with a low CTE include polyetherimide, glass fibers, resin, plastic, and combinations thereof. Between isolator 112 and corrugated isolator support 122 is gap 124. Gap 124 has a constant width between isolator 112 and corrugated isolator support 122. The width of gap 124 is between 0.005 inches and 0.020 inches. The width of gap 124 is preferably 0.007 inches.

Filler material 126, pressure sensing element 128, and plug 130 are also positioned within cavity 118 below corrugated isolator support 122. Filler material 126 is adhered to a bottom of corrugated isolator support 122 and a top of glass plug 130. Filler material 126 is made of a material with a low CTE, for example, polyetherimide, glass fibers, resin, plastic, and combinations thereof. Filler material 126 has a generally cylindrical shape to fit tightly into cavity 118. An inner portion of filler material 126 has a generally toroidal shape with an inner perimeter that matches pressure sensing element 128. Pressure sensing element 128 is positioned inside filler material 126. Pressure sensing element 128 is a strain gauge. Pressure sensor 128 can alternatively be a MEMS device or other stress sensor gauge. Plug 130 encloses a bottom of cavity 118. Pressure sensing element 128 and filler material 126 are both adhered to plug 130. Plug 130 is made of glass. Plug 130 is electrically insulating and hermetically seals cavity 118. Other materials, for example resin, rubber, and plastic can be used to make plug 130. Electrical connections 132 connect to pressure sensing element 128 and run through plug 130 to transmit information regarding the sensed pressure readings to other components. S-pins 134 are in a bottom of plug 130 to secure pressure sensor 110.

Oil 136 fills gap 124 and portions of cavity 118 not filled by corrugated isolator support 122, filler material 126, pressure sensor 128, and plug 130. Oil 136 is silicone oil, but can be any other oil. Oil 136 can move between gap 124 and cavity 118 via a channel in a side of isolator 112 and/or a channel in filler material 126.

Pressure sensor 110 uses isolator 112 to transmit external pressure to internal pressure sensing element 128. When pressure is exerted on isolator 112, isolator 112 moves to a depressed state and moves oil 136 into cavity 118. The increased amount of oil 136 in cavity 118 is sensed by pressure sensing element 128. Pressure sensing element 128 transmits electrical signals indicating the sensed pressure to other components through electrical connections 132.

Filler material 126 and corrugated isolator support 122 reduce the volume of cavity 118 and the amount of oil 134 needed to operate pressure sensor 110. Reducing the amount of oil 134 in cavity 118 and gap 124 reduces temperature-related volume fluctuations in pressure sensor 110 and makes calibration and pressure measurements more accurate.

Corrugated isolator support 122 protects isolator 112 from crush and puncture damage due to its shape matching corrugations 114. A center of isolator 112 is designed to contact corrugated isolator support 122 first before permanent deformation of isolator 112 occurs. Corrugated isolator support 122 does not have a hole in the middle (like dished isolator support 20 shown in FIG. 2), which supports the center of isolator 112 and reduces puncture damage. The center of isolator 112 is supported by the matching, flat surface of a center of corrugated isolator support. The corrugations on corrugated isolator support 122 match corrugations 114 on isolator 112 and support corrugations 114 from crush damage (as shown at C in FIG. 1B). The matching shape of corrugated isolator support 122 with isolator 112 maximizes contact between isolator 112 and corrugated isolator support 122. This prevents damage during dynamic pressure events by minimizing pressure exerted only on isolator 112. Corrugated isolator support 122 can prevent damage to isolator 112 even when dynamic pressure events exert up to 11,000 PSI on pressure sensor 110.

Further, the constant width of gap 124 protects isolator 112 from damage by acting as a hydrodynamic dampener. The constant width of gap 124 provides hydrodynamic resistance to prevent isolator 112 from being damaged during dynamic pressure events. The small size of the constant width of gap 124 also reduces the distance the center of isolator 112 must travel. By quickly contacting corrugated isolator support 120, the middle of isolator 112 receives mechanical support prior to permanent deformation (for example, crush damage shown at C in FIG. 1B) and is less likely to sustain puncture damage (for example, puncture damage shown at P in FIG. 1B).

The combination of corrugated isolator support 122 and gap 124 reduce the likelihood of damage to isolator 112 during dynamic pressure events. This allows pressure sensor 110 to sense over its entire useful range even after multiple dynamic pressure events that would damage isolator 12 in pressure sensor 10 (as discussed in relation to FIGS. 1A-2).

The following are non-exclusive descriptions of possible embodiments of the present invention.

DISCUSSION OF POSSIBLE EMBODIMENTS

A pressure sensor includes a header with a cavity, a pressure sensing element, an isolator, an isolator support, a damping gap, and oil. The pressure sensing element is in the cavity. The isolator has corrugations and is mounted to a top of the header. The isolator covers the cavity. The isolator support is in the cavity of the header above the pressure sensing element. The isolator support is corrugated. The corrugations of the isolator support align with the corrugations on the isolator. The damping gap is between the isolator support and the isolator. The damping gap has a constant width between the isolator support and the isolator. Oil fills the damping gap and the cavity in the header. The oil moves between the damping gap and the header cavity in response to external pressure changes moving the isolator.

The pressure sensor of the preceding paragraph can optionally include, additionally and/or alternatively, any one or more of the following features, configurations and/or additional components:

A further embodiment of the foregoing pressure sensor, and also including an isolator weld ring around an edge of the isolator and welded to the top of the header to mount the isolator onto the header.

A further embodiment of any of the foregoing pressure sensors, and also including a plug positioned in the header cavity to support the pressure sensing element and to seal the cavity. The plug is a glass plug with s-pins.

A further embodiment of any of the foregoing pressure sensors, electrical connections routed through the plug and connected to the pressure sensing element.

A further embodiment of any of the foregoing pressure sensors, wherein the plug electrically and hermetically seals the cavity.

A further embodiment of any of the foregoing pressure sensors, and also including filler material within the cavity of the header. The filler material has a cavity shaped to fit the pressure sensing element. The pressure sensor is positioned inside the filler material. The isolator support is adhered to a top of the filler material.

A further embodiment of any of the foregoing pressure sensors, wherein the cavity of the filler material is toroidal.

A further embodiment of any of the foregoing pressure sensors, wherein the filler material and the isolator support are made of a material with a low coefficient of thermal expansion chosen from the group consisting of polyetherimide, glass fibers, resin, plastic, and combinations thereof.

A further embodiment of any of the foregoing pressure sensors, wherein the oil is silicone oil.

A further embodiment of any of the foregoing pressure sensors, wherein the damping gap is between 0.005 inches (0.127 millimeters) and 0.020 inches (0.508 millimeters).

A further embodiment of any of the foregoing pressure sensors, wherein the damping gap is 0.007 inches (0.178 millimeters).

A further embodiment of any of the foregoing pressure sensors, wherein the pressure sensing element is a strain gauge.

A further embodiment of any of the foregoing pressure sensors, wherein the pressure sensing element is a micro electro-mechanical systems (MEMS) device.

A further embodiment of any of the foregoing pressure sensors, wherein the cavity is cylindrical.

A further embodiment of any of the foregoing pressure sensors, wherein the isolator is made of a metal foil.

While the invention has been described with reference to an exemplary embodiment(s), it will be understood by those skilled in the art that various changes may be made and equivalent embodiment(s) may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A pressure sensor comprising:
a header with a cavity;
a pressure sensing element in the cavity;
an isolator with corrugations mounted to a top of the header covering the cavity;
an isolator support in the cavity of the header above the pressure sensing element, wherein the isolator support is corrugated, and wherein the corrugations of the isolator support align with the corrugations on the isolator;
a damping gap between the isolator support and the isolator, wherein the damping gap has a constant width between the isolator and the isolator support; and
oil filling the damping gap and the cavity in the header, wherein the oil moves between the damping gap and the header cavity in response to external pressure changes moving the isolator.

2. The pressure sensor of claim 1, and further comprising:
an isolator weld ring around an edge of the isolator and welded to the top of the header to mount the isolator onto the header.

3. The pressure sensor of claim 1, and further comprising:
a plug positioned in the header cavity to support the pressure sensing element and to seal the cavity, wherein the plug is a glass plug with s-pins; and
electrical connections routed through the plug and connected to the pressure sensing element.

4. The pressure sensor of claim 3, wherein the plug electrically and hermetically seals the cavity.

5. The pressure sensor of claim 1, and further comprising:
filler material within the cavity of the header, wherein the filler material has a cavity shaped to fit the pressure sensing element;

wherein the pressure sensor is positioned inside the filler material; and wherein the isolator support is adhered to a top of the filler material.

6. The pressure sensor of claim 5, wherein the cavity of the filler material is a toroid.

7. The pressure sensor of claim 5, wherein the filler material and the isolator support are made of a material with a low coefficient of thermal expansion chosen from the group consisting of polyetherimide, glass fibers, resin, plastic, and combinations thereof.

8. The pressure sensor of claim 1, wherein the oil is silicone oil.

9. The pressure sensor of claim 1, wherein the damping gap is between 0.005 inches (0.127 millimeters) and 0.020 inches (0.508 millimeters).

10. The pressure sensor of claim 1, wherein the damping gap is 0.007 inches (0.178 millimeters).

11. The pressure sensor of claim 1, wherein the pressure sensing element is a strain gauge.

12. The pressure sensor of claim 1, wherein the pressure sensing element is a micro electro-mechanical systems (MEMS) device.

13. The pressure sensor of claim 1, wherein the cavity is cylindrical.

14. The pressure sensor of claim 1, wherein the isolator is made of a metal foil.

\* \* \* \* \*